United States Patent [19]

Zhu

[11] Patent Number: 6,037,801
[45] Date of Patent: Mar. 14, 2000

[54] METHOD AND APPARATUS FOR CLOCKING A SEQUENTIAL LOGIC CIRCUIT

[75] Inventor: Qing K. Zhu, Castro Valley, Calif.

[73] Assignee: Intel Corporation, Santa Clara, Calif.

[21] Appl. No.: 08/958,541

[22] Filed: Oct. 27, 1997

[51] Int. Cl.[7] .................................................... G06F 7/38
[52] U.S. Cl. ............................ 326/46; 326/40; 326/39
[58] Field of Search .................................. 326/46, 40, 39

[56] References Cited

U.S. PATENT DOCUMENTS

| | | | |
|---|---|---|---|
| 4,415,818 | 11/1983 | Ogawa et al. | 307/465 |
| 4,933,577 | 6/1990 | Wong et al. | 307/465 |
| 4,963,770 | 10/1990 | Keida | 307/465 |
| 5,003,201 | 3/1991 | Bai | 307/465 |
| 5,221,866 | 6/1993 | Takatsu | 307/465 |
| 5,274,791 | 12/1993 | Bracking et al. | 495/425 |
| 5,450,021 | 9/1995 | Chiang | 326/39 |

*Primary Examiner*—David Nelms
*Assistant Examiner*—Tuan T. Nguyen
*Attorney, Agent, or Firm*—Blakely, Sokoloff, Taylor & Zafman LLP

[57] ABSTRACT

A sequential logic circuit having a series of data signal bistable elements is described. Each data signal bistable element is clocked by a corresponding qualified clock. The qualified clocks are generated by a series of AND gates that each have one input coupled to a global clock and the other input coupled to a valid signal such that the data signal bistable element is only clocked when valid data is present. A series of valid signal bistable elements, one for each data signal bistable element, are used to provide the valid signal to each AND gate. Since the data signal bistable elements are clocked only when valid data is present instead of continuously, the invention provides for a significant reduction in the power consumption of the sequential logic circuit.

19 Claims, 7 Drawing Sheets

METHOD AND APPARATUS FOR CLOCKING A SEQUENTIAL LOGIC CIRCUIT

FIELD OF THE INVENTION

The present invention relates to the field of electronic circuit design and more particularly to the field of clocking sequential logic circuits.

BACKGROUND OF THE INVENTION

Figure 1:
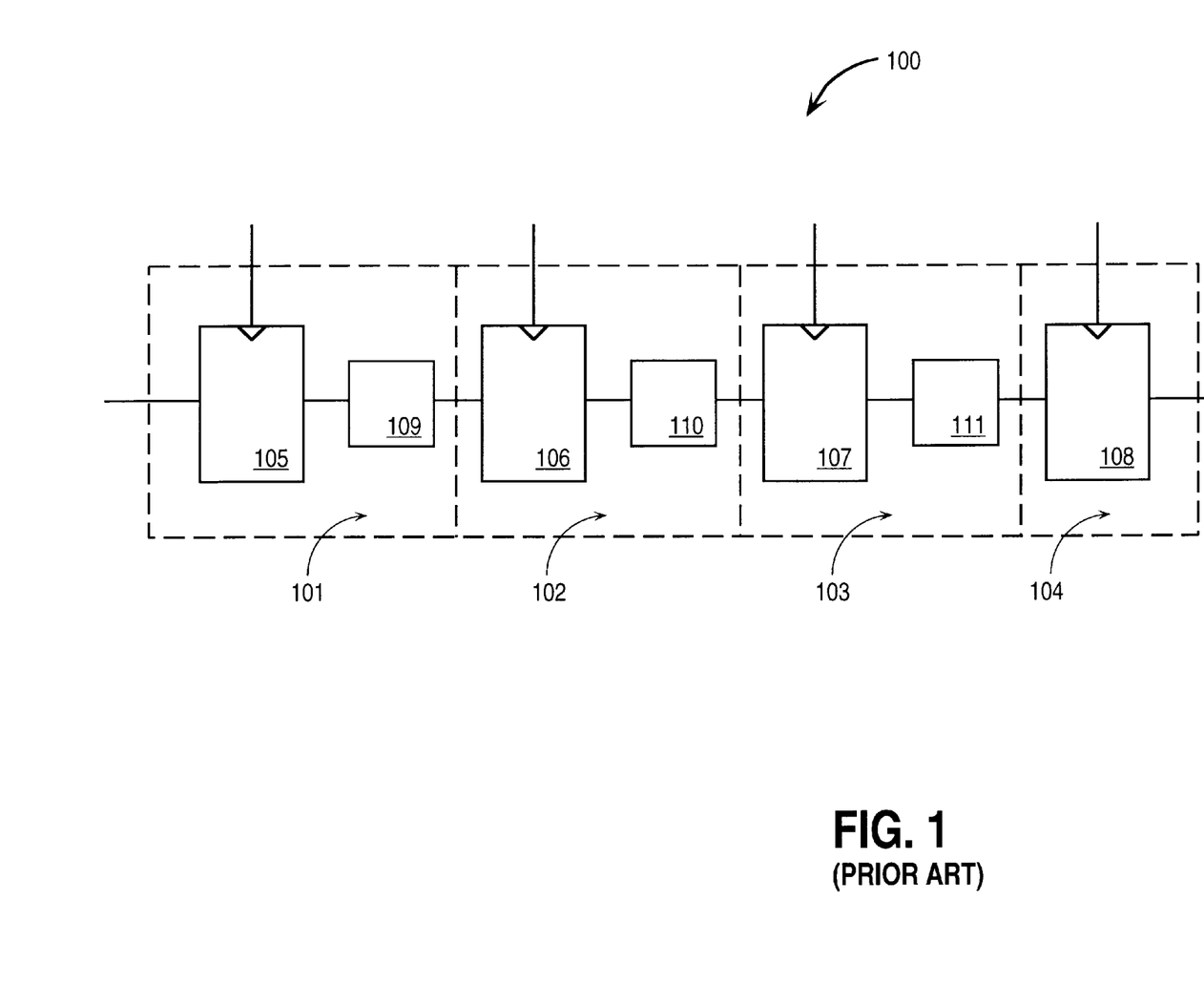
FIG. 1 is a block diagram depicting a prior art sequential logic circuit.

Sequential logic circuits are used extensively in the design of electronic circuits. FIG. 1 depicts a typical sequential logic circuit 100. Stages 101–104 are coupled together in a series configuration, i.e. the output of each non-terminal stage 101–103 feeds the input of the following stage. Each stage includes a clocked bistable element 105–108, such as a flip-flop or a latch, for the synchronous transfer of data. Each non-terminal stage also includes a combinational logic block 109–111 for the manipulation of data. Two clocking schemes are prevalent in such a typical sequential logic circuit. The first, generally preferred when using flip-flops, is to clock all of the bistable elements with a single free running clock. The second, generally preferred when using latches, is to clock all of the bistable elements in an odd numbered stage with a single free running clock and to clock all of the bistable elements in an even numbered stage with the complement of the single free running clock.

When either of these two clocking schemes is used, the power consumed by the sequential logic circuits is often a major component of the total power consumed by an entire electronic circuit, such as a microprocessor. Since the reduction of power consumption is currently one of the key goals of electronic circuit designers, a novel scheme of clocking sequential logic circuits is desired.

SUMMARY OF THE INVENTION

A sequential logic circuit having a series of stages is disclosed. Each stage includes a valid signal bistable element and a data signal bistable element. The data signal bistable element of each stage is clocked with a clock signal that is qualified by an output signal of the corresponding valid signal bistable element.

DETAILED DESCRIPTION OF A PREFERRED EMBODIMENT

A method and apparatus for clocking a sequential logic circuit is described. In the following description, numerous specific details are set forth in order to provide a thorough understanding of the present invention. It will be apparent, however, to one skilled in the art that the present invention can be practiced without regard to these specific details. In other instances, well known circuits and design techniques have not been described in particular detail in order to avoid obscuring the present invention.

Each described embodiment includes a series of data signal bistable elements that are each clocked by a corresponding qualified clock. The qualified clocks are generated by a series of AND gates that each have one input coupled to a global clock and the other input coupled to a valid signal such that the data signal bistable element is only clocked when valid data is present. A series of valid signal bistable elements, one for each data signal bistable element, are used to provide the valid signal to each AND gate. Since the data signal bistable elements are clocked only when valid data is present instead of continuously, the invention provides for a significant reduction in the power consumption of the sequential latch circuit. For example, assume that the invention is used in a floating point adder that is divided into six stages of logic so that it can be clocked at the same frequency as an integer adder. Then, to perform an add operation, the floating point adder will consume approximately one sixth of the power that would be consumed without the use of the invention.

Two embodiments of the apparatus of the present invention will be described in which the bistable elements are flip-flops, and one embodiment will be described in which the bistable elements are latches. Any other type of bistable element can also be used, and a variety of bistable elements can be used within the same embodiment. For example, the data signal bistable elements can be flip-flops and the valid signal elements can be latches within the same embodiment. In one embodiment, the bistable elements have a width of one bit, i.e. they have a single input and a single output. However, it is also possible within the present invention to use wider bistable elements. For example, the data signal bistable elements can have a width of a byte, a word, or a double-word so that their width corresponds to the width of the datapath of the electronic circuit on which they reside. Similarly, the valid signal bistable elements can have a width of an opcode (e.g. three to eight bits).

Figure 2:
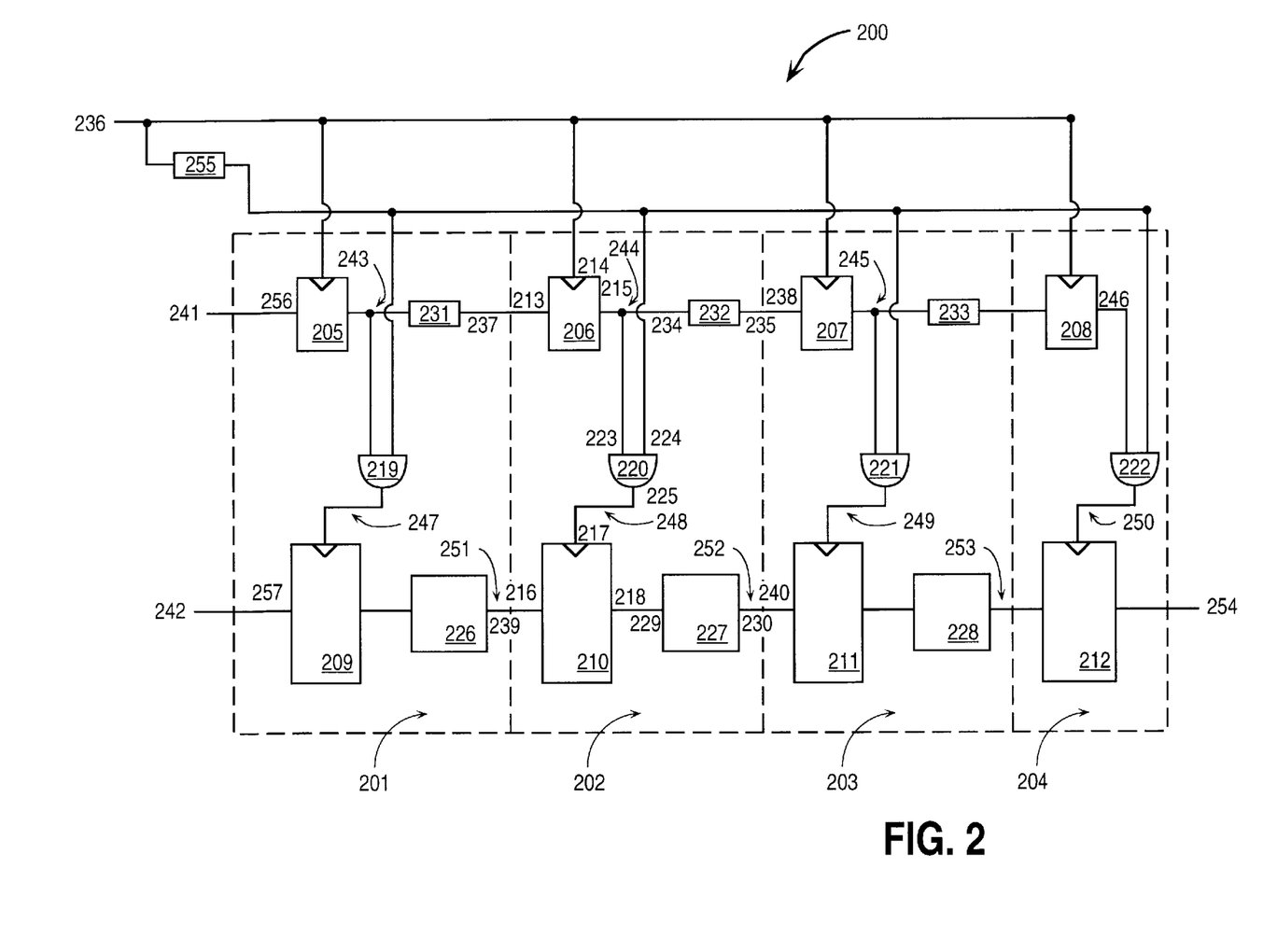
FIG. 2 is a block diagram depicting a first embodiment of the present invention in a sequential logic circuit wherein the bistable elements are flip-flops.

FIG. 2 depicts a first embodiment wherein all of the bistable elements are flip-flops. In FIG. 2, sequential logic circuit 200 comprises a plurality of stages 201–204. A total of four stages are shown in FIG. 2 but any number of stages are possible. Stages 201–204 are coupled together in a series configuration, i.e. each output of each non-terminal stage 201–203 feeds a corresponding input to the following stage. Each stage 202–204 includes a valid signal flip-flop 205–208 and a data signal flip-flop 209–212. Each flip-flop has an input port, a clock port, and an output port. For example, valid signal flip-flop 206 has an input port 213, a clock port 214, and an output port 215. Likewise, data signal flip-flop 210 has an input port 216, a clock port 217, and an output port 218.

Each stage 201–204 also optionally includes a logic gate 219–222. In this embodiment logic gates 219–222 are two input AND gates, but any logic gate or combination of gates that can be used to qualify a clock signal can be used within the scope of the present invention. For example, a three input AND gate can be used, with the extra input providing a further level of clock qualification, such as with a signal that indicates that the flow of data through the sequential logic circuit should be stalled. Alternatively and particularly if valid signal flip-flops 205–208 are multiple bit flip-flops, a combination of gates implementing a decode of the output signals from valid signal flip-flops 205–208 can be used. Each logic gate 219–222 has a first input port, a second input port, and an output port. For example, logic gate 220 has a first input port 223, a second input port 224, and an output port 225.

Each non-terminal stage 201–203 also optionally includes a combinational logic block 226–228. Terminal stage 204 can also include a combinational logic block if desired. Each combinational logic block can perform any function desired in that particular stage of the sequential circuit. Each combinational logic block has an input port and an output port. For example, combinational logic block 227 has an input port 229 and an output port 230.

Each non-terminal stage 201–203 also optionally includes a delay element 231–233. Terminal stage 204 can also include a delay element if desired. Delay elements 231–233 can be used to ensure proper operation of sequential logic circuit 200 despite clock skew and to prevent hold time violations. Delay elements 231–233 can include any logic gates desired, such as two inverters coupled in series. Alternatively and particularly in an embodiment in which the data signal bistable elements are flip-flops and the valid signal bistable elements are latches, delay elements 231–233 can be latches clocked by the complement of the clock signal used to clock the valid signal latches. Each delay element 231–233 has an input port and an output port. For example, delay element 232 has an input port 234 and an output port 235.

FIG. 2 shows how each stage of sequential logic circuit 200 is constructed from the interconnection of the individual elements. As an example, the interconnection of the elements of stage 202 will be described. Global clock signal 236 is coupled to clock port 214 of valid signal flip-flop 206 and through optional delay element 255 to second input port 224 of logic gate 220. Delay element 255 can include any logic gates desired, such as two inverters coupled in series. Output port 215 of valid signal flip-flop 206 is coupled to first input port 223 of logic gate 220 and to input port 234 of delay element 232. Output port 225 of logic gate 220 is coupled to clock port 217 of data signal flip-flop 210. Output port 218 of data signal flip-flop 210 is coupled to input port 229 of combinational logic block 227.

FIG. 2 also shows how the stages of sequential logic circuit 200 are connected to each other in a series configuration. As an example, the connection of stage 202 to preceding stage 201 and to following stage 203 will be described. Input port 213 of valid signal flip-flop 206 in stage 202 is coupled to output port 237 of delay element 231 in stage 201. Output port 235 of delay element 232 in stage 202 is coupled to input port 238 of valid signal flip-flop 207 in stage 203. Input port 216 of data signal flip-flop 210 in stage 202 is coupled to output port 239 of combinational logic block 226 in stage 201. Output port 230 of combinational logic block 227 in stage 202 is coupled to input port 240 of data signal flip-flop 211 in stage 203.

Figure 3:
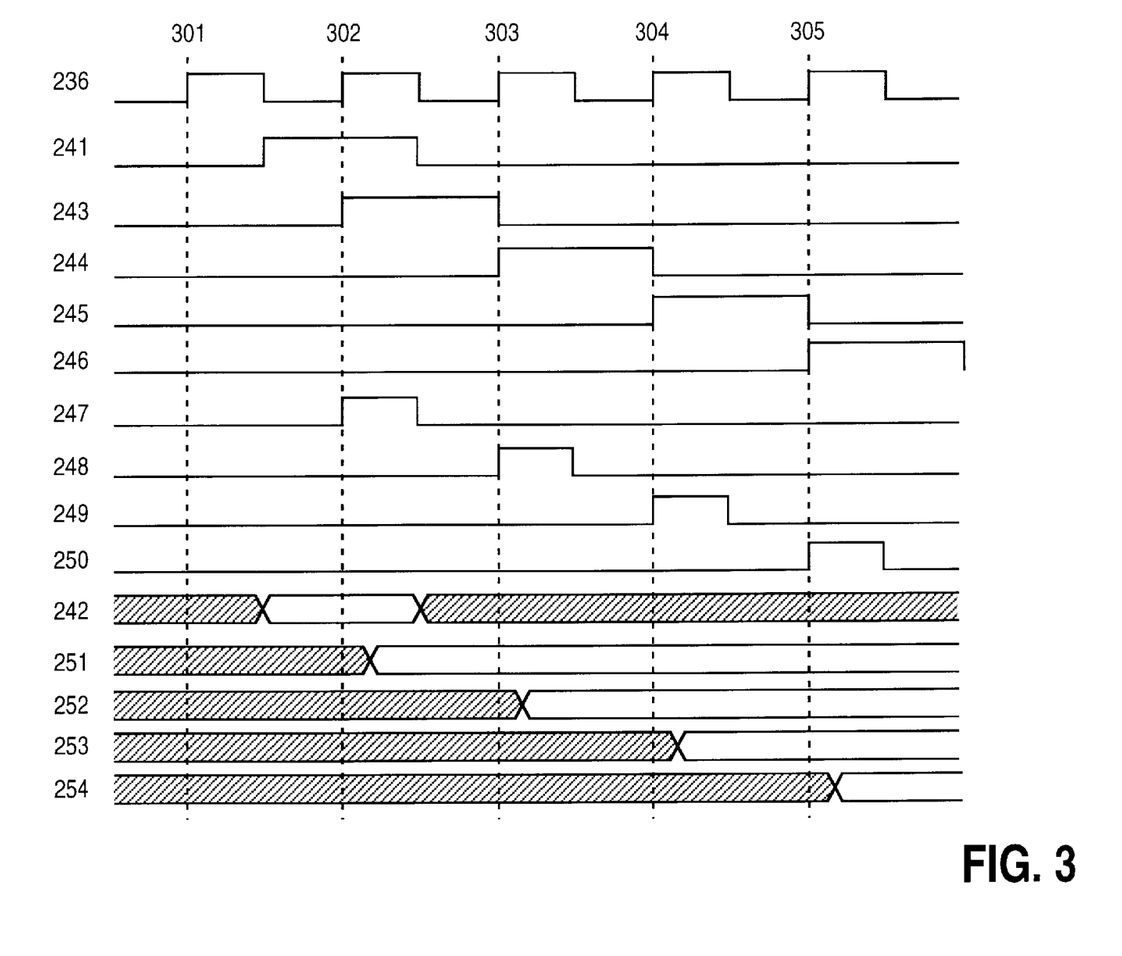
FIG. 3 is a timing diagram illustrating the operation of the sequential logic circuit of FIG. 2.

The operation of the sequential logic circuit of FIG. 2 will be explained with reference to FIG. 3, which is a timing diagram depicting the response of sequential logic circuit 200 to three input signals, global clock signal 236, valid signal 241, and data input signal 242. Valid signal 241 is generated externally to sequential logic circuit 200 to indicate whether data input signal 242 is valid, i.e. represents information on which the performance of the function implemented by sequential logic circuit 200 is desired. Note that in FIGS. 2 and 3, valid signal 241 is an active high signal, but that is not a requirement of the present invention. The response of sequential logic circuit 200 is depicted in FIG. 3 by showing the waveforms of internal valid signals 243–246, qualified clock signals 247–250, internal data signals 251–253, and data output signal 254. Assume that sequential logic circuit 200 has been initialized using any well known technique such that internal valid signals 243–246 are all low prior to time 301 in FIG. 3.

At time 301 in FIG. 3, valid signal 241 is low, indicating that data input signal 242 is invalid. All internal valid signals 243–246 and all qualified clock signals 247–250 remain low; therefore no data is transferred through any of data signal flip-flops 209–212.

Between times 301 and 302, valid signal 241 is asserted to indicate that data input signal 242 is now valid. At time 302, valid signal 241 is being presented to the input 256 of the series of valid signal flip-flops 205–208 while data signal 242 is being presented to the input 257 of the series of data signal flip-flops 209–212. Valid signal flip-flop 205 is clocked by global clock signal 236, so the rising edge of global clock signal 236 at time 302 results in the rise of internal valid signal 243. Global clock signal 236 is qualified by internal valid signal 243 through logic gate 219, so the rise of both internal valid signal 243 and global clock signal 236 results in the rise of qualified clock signal 247. Data signal flip-flop 209 is clocked by qualified clock signal 247, so the rising edge of qualified clock signal 247 results in internal data signal 251 becoming valid after the delay through combinational logic block 226.

Then, at time 303, the rising edge of global clock signal 236 results in the rise of internal valid signal 244, the qualification of global clock signal 236 through logic gate 220, the rise of qualified clock signal 248, and the clocking of data signal flip-flop 210. At time 304, the rising edge of global clock signal 236 results in the rise of internal valid signal 245, the qualification of global clock signal 236 through logic gate 221, the rise of qualified clock signal 249, and the clocking of data signal flip-flop 211. Finally, at time 305, the rising edge of global clock signal 236 results in the rise of internal valid signal 246, the qualification of global clock signal 236 through logic gate 222, the rise of qualified clock signal 250, and the clocking of data signal flip-flop 212 so that data output signal 254 becomes valid.

Note that valid signal 241 is deasserted between times 302 and 303 to indicate that data signal 242 becomes invalid. Therefore, each internal valid signal 243–246 falls one clock period after it rises. Delay element 255 can be used between global clock signal 236 and the second input ports of logic gates 219–222 in order to prevent glitches on qualified clock signals 247–250 due to the delay in the fall time of internal valid signals 243–246. Then, each of qualified clock signals 247–250 has only one rising edge and each data signal flip-flop 209–212 is clocked only once. Therefore, to perform its function, four stage sequential logic circuit 200 consumes approximately one fourth of the power consumed by an equivalent sequential logic circuit in which each data flip-flop was clocked four times.

Figure 4:
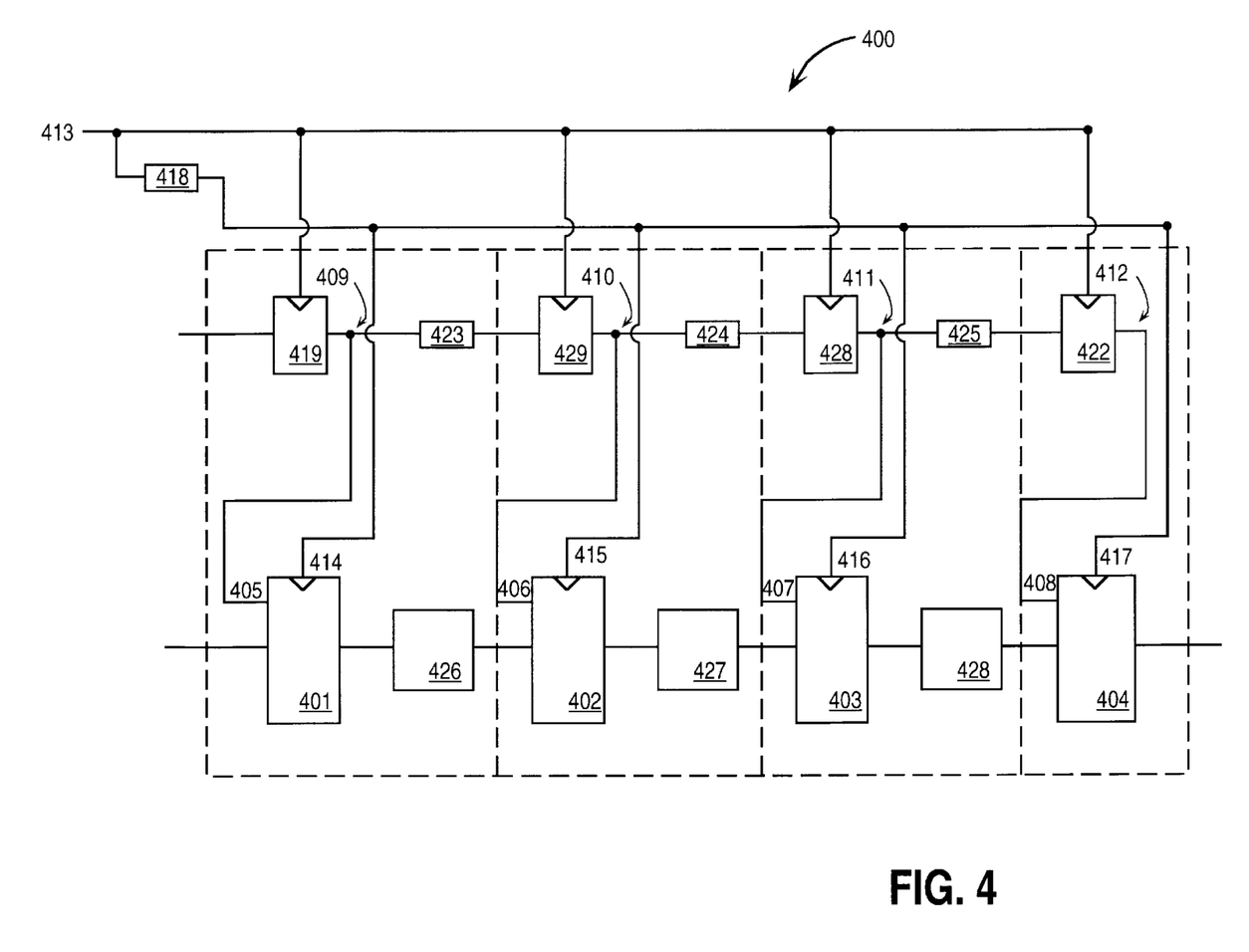
FIG. 4 is a block diagram depicting a second embodiment of the present invention in a sequential logic circuit wherein the bistable elements are flip-flops.

A second embodiment in which all of the bistable elements are flip-flops is shown in FIG. 4. In sequential logic circuit 400 as depicted in FIG. 4, data signal flip-flops 401–404 each have an enable port 405–408 coupled to internal valid signals 409–412. Therefore, no logic gates are needed to qualify global clock signal 413 to clock ports 414–417 of data signal flip-flops 401–404. Delay element 418 can be used between global clock signal 413 and clock ports 414–417 of data signal flip-flops 401–404 to compensate for the delay through valid signal flip-flops 419–422. No data is transferred through a data signal flip-flop 401–404 unless the corresponding internal valid signal 409–411 is high. Optional delay elements 423–425 can be used to ensure proper operation of sequential logic circuit 400 despite clock skew or to prevent hold time violations, and combinational logic blocks 426–428 can be used to implement the function of sequential logic circuit 400. The operation of sequential logic circuit 400 is essentially identical to that of sequential logic circuit 200.

Figure 5:
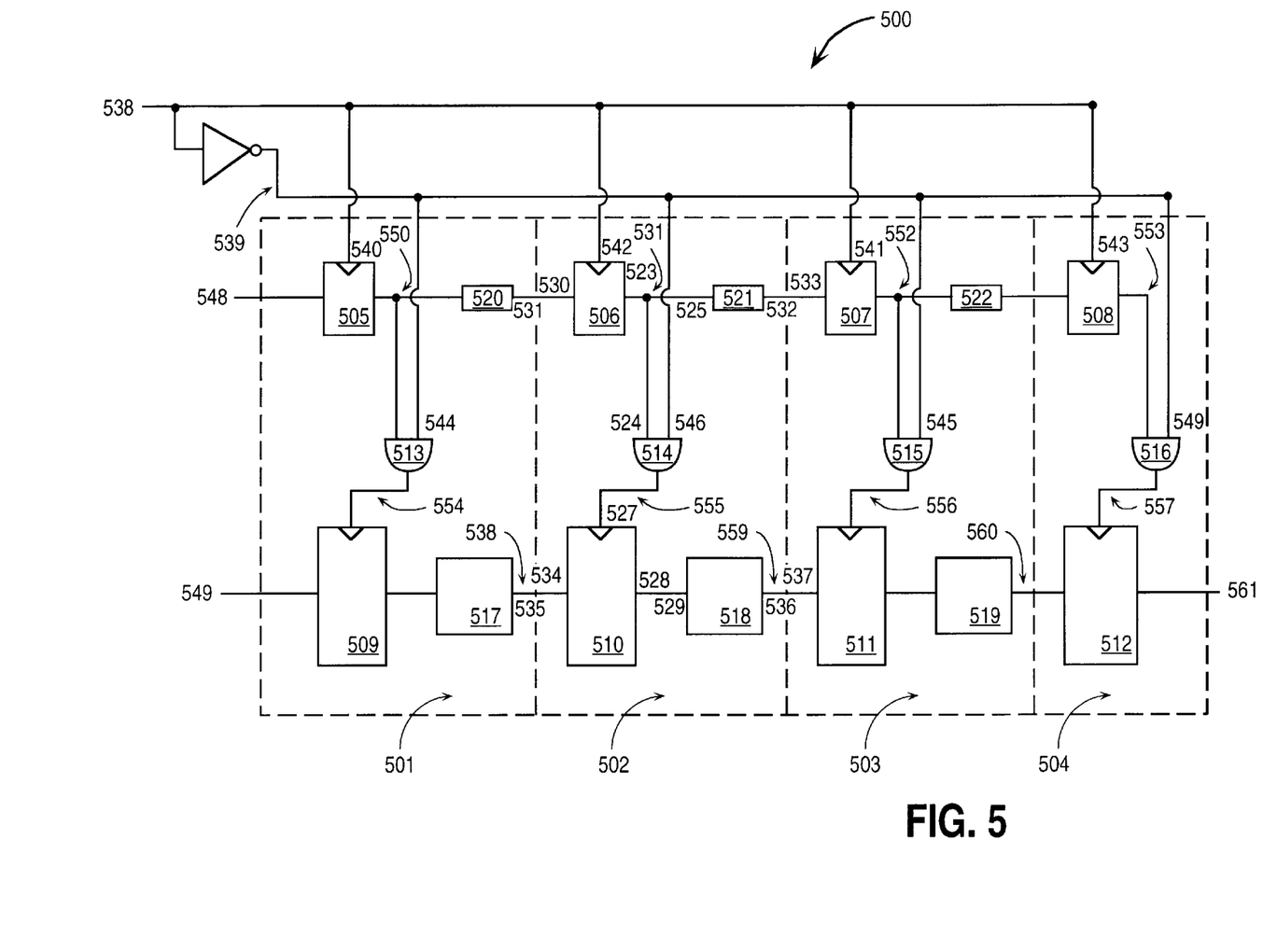
FIG. 5 is a block diagram depicting an embodiment of the present invention in a sequential logic circuit wherein the bistable elements are latches.

A third embodiment of the apparatus of the present invention is shown in FIG. 5. In this embodiment all of the bistable elements are latches. In FIG. 5, sequential logic circuit 500 comprises a plurality of stages 501–504 coupled together in a series configuration. Each stage 501–504 includes a valid signal latch 505–508 and a data signal latch 509–512. Each stage 501–504 also optionally includes a logic gate 513–516. In this embodiment logic gates 513–516 are two input AND gates. Each non-terminal stage 501–503 also optionally includes a combinational logic block 517–519 and a delay element 520–522.

FIG. 5 shows how each stage of sequential logic circuit 500 is constructed from the interconnection of the individual elements. As an example, the interconnection of the elements of stage 502 will be described. Output port 523 of valid signal latch 506 is coupled to first input port 524 of logic gate 514 and to input port 525 of delay element 521. Output port 526 of logic gate 514 is coupled to clock port 527 of data signal latch 510. Output port 528 of data signal latch 510 is coupled to input port 529 of combinational logic block 518.

FIG. 5 also shows how the stages of sequential logic circuit 500 are connected to each other in a series configuration. As an example, the connection of stage 502 to preceding stage 501 and to following stage 503 will be described. Input port 530 of valid signal latch 506 in stage 502 is coupled to output port 531 of delay element 520 in stage 501. Output port 532 of delay element 521 in stage 502 is coupled to input port 533 of valid signal latch 507 in stage 503. Input port 534 of data signal latch 510 in stage 502 is coupled to output port 535 of combinational logic block 517 in stage 501. Output port 536 of combinational logic block 518 in stage 502 is coupled to input port 537 of data signal latch 511 in stage 503.

FIG. 5 also shows how global clock signals 538 and complementary global clock signal 539 are coupled to sequential logic circuit 500. In this embodiment complementary global clock signal 539 is the complement of global clock signal 538, although that is not a requirement of the invention. Global clock signal 538 is coupled to the clock ports of the valid signal latches in the stages at an odd position in the series configuration, i.e. clock port 540 of valid signal latch 505 and clock port 541 of valid signal latch 507. Complementary global clock signal 539 is coupled to the clock ports of the valid signal latches in the stages at an even position in the series configuration, i.e. clock port 542 of valid signal latch 506 and clock port 543 of valid signal latch 508. Complementary global clock signal 539 is also coupled to the second input port of the logic gates in the odd stages, i.e. second input port 544 of logic gate 513 and second input port 545 of logic gate 515. Likewise, global clock signal 538 is also coupled to the second input port of the logic gates in the even stages, i.e. second input port 546 of logic gate 514 and second input port 547 of logic gate 516.

Figure 6:
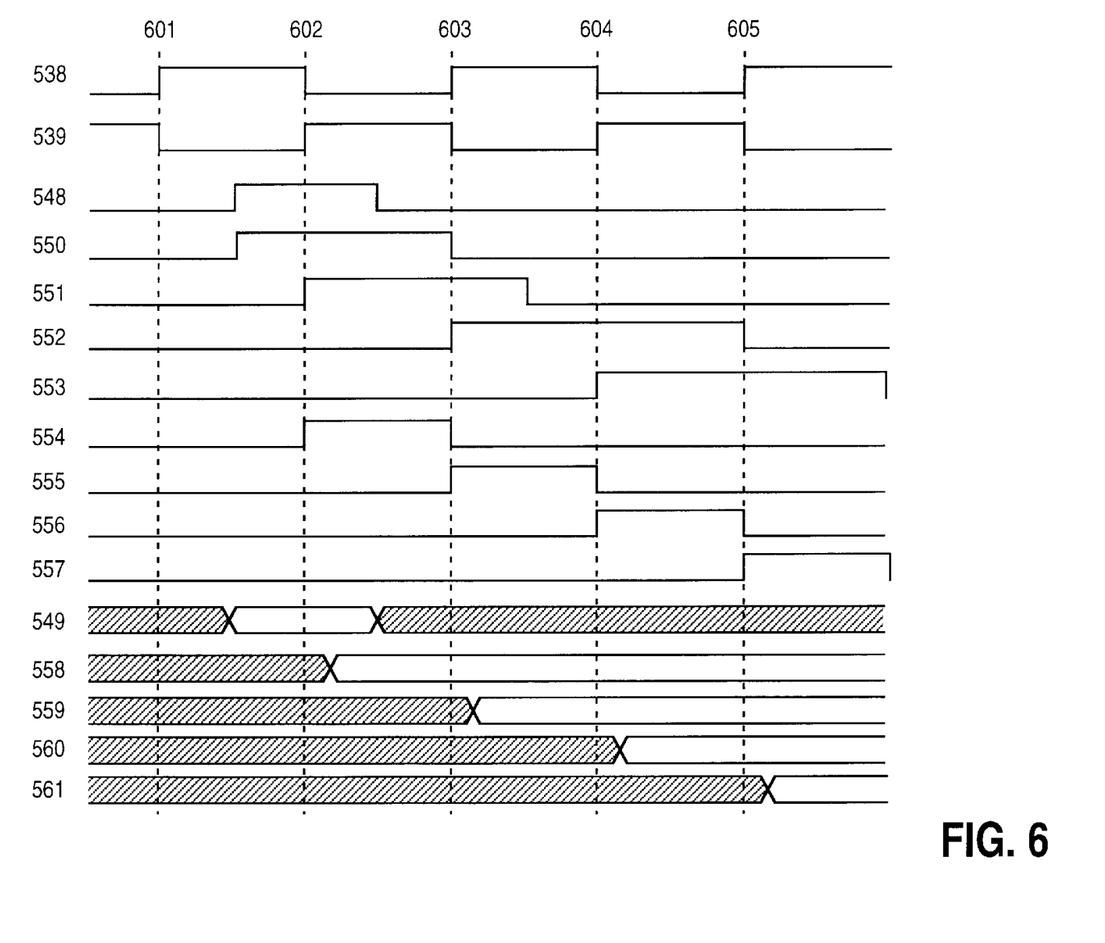
FIG. 6 is a timing diagram illustrating the operation of the sequential logic circuit of FIG. 5.

The operation of the sequential logic circuit of FIG. 5 will be explained with reference to FIG. 6, which is a timing diagram depicting the response of sequential logic circuit 500 to four input signals, global clock signal 538, complementary global clock signal 539, valid signal 548, and data input signal 549. Valid signal 548 is generated external to sequential logic circuit 500 to indicate whether data input signal 549 is valid. Note that in FIGS. 5 and 6, valid signal 548 is an active high signal, but that is not a requirement of the present invention. The response of sequential logic circuit 500 is depicted in FIG. 6 by showing the waveforms of internal valid signals 550–553, qualified clock signals 554–557, internal data signals 558–560, and data output signal 561. Assume that sequential logic circuit 500 has been initialized using any well known technique such that internal valid signals 550–553 are all low prior to time 601 in FIG. 6.

At time 601 in FIG. 6, valid signal 548 is low, indicating that data input signal 549 is invalid. All internal valid signals 550–553 and all qualified clock signals 554–557 remain low, therefore no data is transferred through any of data signal latches 509–512.

Between times 601 and 602, valid signal 548 is asserted to indicate that data input signal 549 is now valid. Since global clock signal 538 is high, valid signal latch 505 is open and internal valid signal 550, which is used to qualify complementary global clock signal 539 through logic gate 513, rises. Therefore, qualified clock signal 554 rises as a result of the rise of complementary global clock signal 539 at time 602. Data is then transferred through data signal latch 509, resulting in internal data signal 558 becoming valid after the delay through combinational logic block 517.

Also at time 602, valid signal latch 506 opens, resulting in the rise of internal valid signal 551. Then, at time 603, qualified clock signal 555 rises and data is transferred through data signal latch 510. Similarly, valid signal latch 507 opens at time 603 and data is transferred through data signal latch 511 at time 604. Finally, valid signal latch 508 opens at time 604 and data is transferred through data signal latch 512 at time 605, resulting in data output signal 561 becoming valid.

Figure 7:
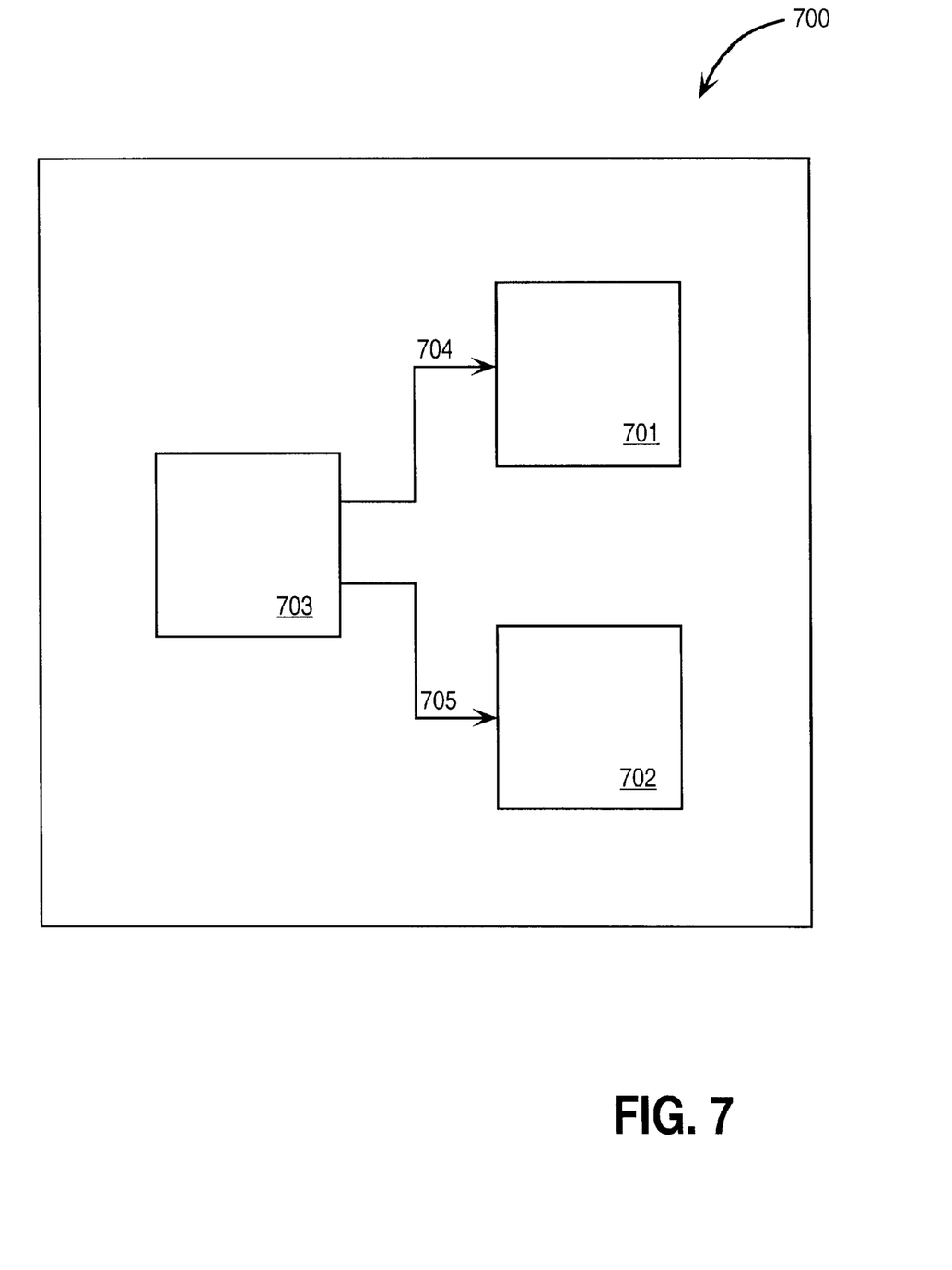
FIG. 7 is a block diagram depicting an embodiment of the present invention in a microprocessor.

Finally, an embodiment of the present invention in a microprocessor 700 is depicted in FIG. 7. In FIG. 7, first execution unit 701 executes a first type of instruction and second execution unit 702 executes a second type of instruction. Execution units for executing any type of instruction can be used. For example, execution unit 701 can execute a floating point add and execution unit 702 can execute a floating point multiply. Each execution unit comprises a plurality of stages coupled together in a series configuration, where the stages and their configuration is in accordance with any of the above descriptions of a novel sequential logic circuit.

Also shown in FIG. 7, instruction decode unit 703 supplies a first valid signal 704 for indicating that the first type of instruction has been decoded and a second valid signal 705 for indicating that the second type of instruction has been decoded. Valid signal 704 is coupled as an input to the first valid signal bistable element of first execution unit 701 and valid signal 705 is coupled as an input to the first valid signal bistable element of second execution unit 702. Therefore, the data signal bistable elements of first execution unit 701 are only clocked as needed to execute an instruction of the first type and the data signal bistable elements of second execution unit 702 are only clocked as needed to execute an instruction of the second type.

Thus, several exemplary embodiments of the apparatus and method of the present invention have been described.

However, the invention is not limited to these embodiments or the details that have been provided to best describe these embodiments. The specification and drawings must be regarded in an illustrative rather than a restrictive sense. The scope of the invention is defined by the following claims.

What is claimed is:

1. A sequential logic circuit comprising a plurality of stages coupled together in a series configuration, each stage comprising:
   a valid signal bistable element; and
   a data signal bistable element clocked by a clock signal qualified by an output signal of said valid signal bistable element, the data signal bistable element having a data input port and a data output port, wherein the data output port of the data signal bistable element of each non-terminal stage is coupled to the data input port of the data signal bistable element of a following stage.

2. A sequential logic circuit comprising a plurality of stages coupled together in a series configuration, each stage comprising:
   a data signal bistable element having a clock port, a data input port, and a data output port;
   a valid signal bistable element having an input port for receiving a valid signal and an output port; and
   a logic gate having a first input port coupled to said output port of said valid signal bistable element, a second input port coupled to a clock signal, and an output port coupled to said clock port of said data signal bistable element;
   wherein the data output port of the data signal bistable element of each non-terminal stage is coupled to the data input port of the data signal bistable element of a following stage.

3. The sequential logic circuit of claim 2 wherein said logic gate performs an AND function.

4. A sequential logic circuit comprising a plurality of stages coupled together in a series configuration, each stage comprising:
   a valid signal bistable element; and
   a data signal bistable element having an enable port coupled to an output signal of said valid signal bistable element, a data input port, and a data output port;
   wherein said data output port of said data signal bistable element of each non-terminal stage is coupled to said data input port of said data signal bistable element of a following stage.

5. A sequential logic circuit comprising a plurality of stages coupled together in a series configuration wherein:
   each stage at an odd position in said series configuration comprises a valid signal latch clocked by a first clock signal and a data signal latch clocked by a second clock signal qualified by an output signal of said valid signal latch; and
   each stage at an even position in said series configuration comprises a valid signal latch clocked by said second clock signal and a data signal latch clocked by said first clock signal qualified by an output signal of said valid signal latch.

6. The sequential logic circuit of claim 5 wherein said second clock signal is the complement of said first clock signal.

7. A sequential logic circuit comprising:
   a first data signal latch having an input port for receiving a data input signal, a clock port, and an output port;
   a first valid signal latch having an input port for receiving a valid signal, a clock port coupled to a first clock signal, and an output port;
   a first logic gate having a first input port coupled to said output port of said first valid signal latch, a second input port coupled to a second clock signal, and an output port coupled to said clock port of said first data signal latch;
   a second valid signal latch having an input port coupled to said output port of said first valid signal latch, a clock port coupled to said second clock signal, and an output port;
   a second logic gate having a first input port coupled to said output port of said second valid signal latch, a second input port coupled to said first clock signal, and an output port; and
   a second data signal latch having an input port coupled to said output port of said first data signal latch, a clock port coupled to said output port of said second logic gate, and an output port for supplying a data output signal.

8. The sequential logic circuit of claim 7 wherein said second clock signal is the complement of said first clock signal.

9. The sequential logic circuit of claim 7 wherein each of said first and said second logic gates performs an AND function.

10. The sequential logic circuit of claim 7 further comprising a combinational logic block coupled between said output port of said first data signal latch and said input port of said second data signal latch.

11. The sequential logic circuit of claim 7 further comprising a delay element coupled between said output port of said first valid signal latch and said input port of said second valid signal latch.

12. A microprocessor comprising:
   an instruction decode unit supplying a first valid signal for indicating whether a first type of instruction has been decoded; and
   a first execution unit for executing the first type of instruction, said first execution unit comprising a plurality of stages coupled together in a series configuration, each stage comprising:
   a valid signal bistable element; and
   a data signal bistable element clocked by a clock signal qualified by an output signal of said valid signal bistable element;
   wherein said first valid signal is coupled as an input to a first valid signal bistable element in said series configuration of stages of said first execution unit.

13. The microprocessor of claim 12 wherein said instruction decode unit further supplies a second valid signal for indicating whether a second type of instruction has been decoded, said microprocessor further comprising:
   a second execution unit for executing the second type of instruction, said second execution unit comprising a plurality of stages coupled together in a series configuration, each stage comprising:
   a valid signal bistable element; and
   a data signal bistable element clocked by a clock signal qualified by an output signal of said valid signal bistable element of the second execution unit;
   wherein said second valid signal is coupled as an input to a first valid signal bistable element in said series configuration of stages of said second execution unit.

14. A microprocessor comprising:

an instruction decode unit supplying a first valid signal for indicating whether a first type of instruction has been decoded; and a first execution unit for executing the first type of instruction, said first execution unit comprising:

a first data signal latch having an input port for receiving a first data input signal, a clock port, and an output port;

a first valid signal latch having an input port for receiving said first valid signal, a clock port coupled to a first clock signal, and an output port;

a first logic gate having a first input port coupled to said output port of said first valid signal latch, a second input port coupled to a second clock signal, and an output port coupled to said clock port of said first data signal latch;

a first combinational logic block having an input port coupled to said output port of said first data signal latch and an output port;

a second valid signal latch having an input port coupled to said output port of said first valid signal latch, a clock port coupled to said second clock signal, and an output port;

a second logic gate having a first input port coupled to said output port of said second valid signal latch, a second input port coupled to said first clock signal, and an output port; and     a second data signal latch having an input port coupled to said output port of said first combinational logic block, a clock port coupled to said output port of said second logic gate, and an output port for supplying a first data output signal.

15. The microprocessor of claim 14 wherein said second clock signal is the complement of said first clock signal.

16. The microprocessor of claim 14 wherein said first and said second logic gates each perform an AND function.

17. The microprocessor of claim 14 further comprising a delay element coupled between said output port of said first valid signal latch and said input port of said second valid signal latch.

18. The microprocessor of claim 14 wherein said instruction decode unit further supplies a second valid signal for indicating whether a second type of instruction has been decoded, said microprocessor further comprising:

a second execution unit for executing the second type of instruction, said second execution unit comprising:

a third data signal latch having an input port for receiving a second data input signal, a clock port, and an output port;

a third valid signal latch having an input port for receiving said second valid signal, a clock port coupled to a first clock signal, and an output port;

a third logic gate having a first input port coupled to said output port of said third valid signal latch, a second input port coupled to a second clock signal, and an output port coupled to said clock port of said third data signal latch;

a second combinational logic block having an input port coupled to said output port of said third data signal latch and an output port;

a fourth valid signal latch having an input port coupled to said output port of said third valid signal latch, a clock port coupled to said second clock signal, and an output port;

a fourth logic gate having a first input port coupled to said output port of said fourth valid signal latch, a second input port coupled to said first clock signal, and an output port; and     a fourth data signal latch having an input port coupled to said output port of said second combinational logic block, a clock port coupled to said output port of said fourth logic gate, and an output port for supplying a second data output signal.

19. A method of clocking a sequential logic circuit comprising a series of data signal bistable elements, said method comprising the steps of:

asserting a valid signal to indicate that a corresponding data signal is valid;

presenting said valid signal to the input of a series of valid signal bistable elements while said data signal is present at the input of said series of data signal bistable elements;

qualifying a clock signal based on an output of one of said series of valid signal bistable elements to create a qualified clock signal;

clocking one of said series of data signal bistable elements of said sequential logic circuit with said qualified clock signal; and     repeating the steps of qualifying a clock signal and clocking one of said series of data signal bistable elements at least one time to clock the remainder of said series of data signal bistable elements of said sequential logic circuit.

* * * * *

UNITED STATES PATENT AND TRADEMARK OFFICE
CERTIFICATE OF CORRECTION

PATENT NO. : 6,037,801
DATED : March 14, 2000
INVENTOR(S) : Zhu

It is certified that error appears in the above-identified patent and that said Letters Patent is hereby corrected as shown below:

In column 2, at line 51, delete "202" and insert --201--.

Signed and Sealed this

Seventeenth Day of April, 2001

Attest:

NICHOLAS P. GODICI

Attesting Officer     Acting Director of the United States Patent and Trademark Office